United States Patent [19]

Terwilliger et al.

[11] Patent Number: 5,027,949
[45] Date of Patent: Jul. 2, 1991

[54] LOCK FOR MAGNETIC TAPE REEL SHIPPING CASE

[75] Inventors: F. Edward Terwilliger, Hudson, Wis.; Davis W. Chamberlin, St. Paul, Minn.; Jon R. Clark, Minneapolis, Minn.; Gerald J. Niles, St. Paul, Minn.

[73] Assignee: Minnesota Mining and Manufacturing Company, St. Paul, Minn.

[21] Appl. No.: 429,271

[22] Filed: Oct. 31, 1989

[51] Int. Cl.⁵ ............................................. B65D 85/67
[52] U.S. Cl. ...................................... 206/406; 206/405
[58] Field of Search .......................... 206/403, 405, 406

[56] References Cited

U.S. PATENT DOCUMENTS

| | | | |
|---|---|---|---|
| 3,353,660 | 11/1967 | Will | 206/52 |
| 3,447,673 | 6/1969 | Rahaim | 206/405 |
| 3,454,153 | 7/1969 | Jensen | 206/405 |
| 3,469,681 | 9/1969 | Norman, Jr. | 206/405 |
| 3,480,134 | 11/1969 | Waddington | 206/405 |
| 3,504,652 | 4/1970 | Norman, Jr. | 206/405 |
| 3,700,098 | 10/1972 | Posso | 206/406 |
| 3,863,762 | 2/1975 | Arai | 206/405 |
| 3,882,701 | 5/1975 | Winth | 206/405 |
| 4,083,449 | 4/1978 | Rubins | 206/405 |
| 4,222,487 | 9/1980 | Abel | 206/405 |
| 4,676,370 | 6/1987 | Rudick | 206/405 |

OTHER PUBLICATIONS

Minnesota mining and Manufacturing Co., Seven Piece Lock Assembly, 1969, 1 page.

*Primary Examiner*—William I. Price
*Attorney, Agent, or Firm*—Kinney & Lange

[57] ABSTRACT

A lock assembly for a shipping case includes a rotatable knob received within an aperture of a lid. A latch bar rotatable with the knob is engageable with a ramped ledge in a protruding hub of the base. Rotating the knob secures the shipping case lid to the base. The knob includes a lock operator pivotally attached within a channel formed in a bowl of the knob. A lock beam of the lock operator, upon rotation of the knob, is engageable with any one of a plurality of detents formed in the lid that define the open, closed and locked states of the shipping case. A resilient spring plank formed integrally with the lock operator engages a recess formed in the knob and acts to bias the lock beam into engagement with the detents. A fastener assembly mounts the latch bar to the knob.

23 Claims, 5 Drawing Sheets 5,027,949

LOCK FOR MAGNETIC TAPE REEL SHIPPING CASE

BACKGROUND OF THE INVENTION

1. Field of the Invention

This invention relates generally to containers. In particular, the present invention is directed to a lock assembly for securing together the housing members of a magnetic reel shipping case.

2. Description of the Prior Art

Lock assemblies for containers are in widespread use. In one type of shipping case for magnetic tape reels, the case has a lid or cover member which is secured to a base member, with the tape reel protectively received therein. The lock assembly for this case has three positions: (1) open, which allows the case members to be assembled or separated, (2) closed, which holds the assembled case members together, and (3) locked, which affirmatively locks the case members together.

The existing lock assembly for such a shipping case includes a molded latch operator or knob rotatably received within a recess formed in the lid of the case. A metal latch bar attached to a body of the knob is engageable with a ledge of a protruding hub formed on the base of the shipping case. Rotating the knob causes the latch bar to engage the ledge, thereby securing the lid to the base.

In this lock assembly, a channel formed in a bowl of the knob is shaped to receive a U-shaped metal bracket. A bight of the bracket includes an opening for a bolt that extends through the body of the knob and through an aperture formed in the latch bar. A nut threaded on the bolt adjacent the latch bar secures the bracket within the channel of the bowl and the latch bar to the body of the knob. The body is formed with a groove to receive the latch bar to ensure that the knob and bar rotate as a single unit.

A molded lock operator defined by a planar member and an integral lock beam is pivotally received within the channel of the knob. The lock operator is pivotally mounted by a transverse pivot axle integrally formed with the planar member. Opposite ends of the pivot axle are received in apertures formed in legs of the U-shaped bracket. The lock beam extends through an opening formed in the bottom of the bowl and upon rotation of the knob is engageable with any one of a plurality of detents in the lid that define the open, closed and locked states of the case. A torsion spring is received on the pivot axle and opposite ends of the spring engage the bowl and planar member to bias the lock beam of the lock operator into engagement with the detents. This lock assembly is difficult to assemble due to the large number of component parts. In addition, the large number of component parts translate into high material costs.

It is evident that there is a continuing need for improved lock assemblies for containers. Specifically, a lock assembly is needed that has less component parts, can be molded to reduce material costs and is easier to assemble.

SUMMARY OF THE INVENTION

The present invention is a lock assembly for a magnetic reel shipping case which includes a knob or latch operator rotatably received in a center aperture of a lid member. The knob includes a bowl and an integral body having a latch bar mounted thereon by a fastener assembly. Opposite ends of the latch bar are receivable through an opening in a protruding hub of a base member of the shipping case. Upon rotation of the knob, the ends of the latch bar engage a ramped ledge in the protruding hub, thereby securing the lid member to the base.

A lock operator is pivotally mounted within a channel formed within the bowl of the knob. The lock operator includes an integral lock beam that extends through a bottom of the bowl and upon rotation of the knob is engageable with any one of a plurality of detents in the lid that define the open, closed and locked states of the shipping case. A resilient, spring plank integral with the lock operator engages a recess formed in the body of the knob and acts to bias the lock beam into engagement with the detents as the knob is rotated. To lock the shipping case, the lid and base are assembled and the knob is rotated until the lock beam of the lock operator engages the locked state detent. To unlock the lid from the base, the lock operator is pivoted against the bias of the resilient spring plank lifting the lock beam from the detent and the knob is rotated away from the locked state detent.

In a preferred embodiment, the latch bar is secured to the body of the knob by a screw and a pair of interengaging protrusions and openings that ensure that the latch bar rotates with the knob. In other embodiments, various arrangements of interengaging protrusions and openings are used to prevent relative rotation between the knob and latch bar. Free ends of the protrusions are deformed to secure the latch bar to the body of the knob. In another embodiment, posts engage an outer edge of the latch bar so that the latch bar rotates with the knob. A free end of a protrusion engaging an opening in the latch bar is deformed to secure the bar to the knob body.

The lock assembly of this invention has fewer parts than prior art devices. As a consequence, material costs are reduced and the resultant components are easier to assemble.

BRIEF DESCRIPTION OF THE INVENTION

DETAILED DESCRIPTION OF THE PREFERRED EMBODIMENTS

Figure 1:
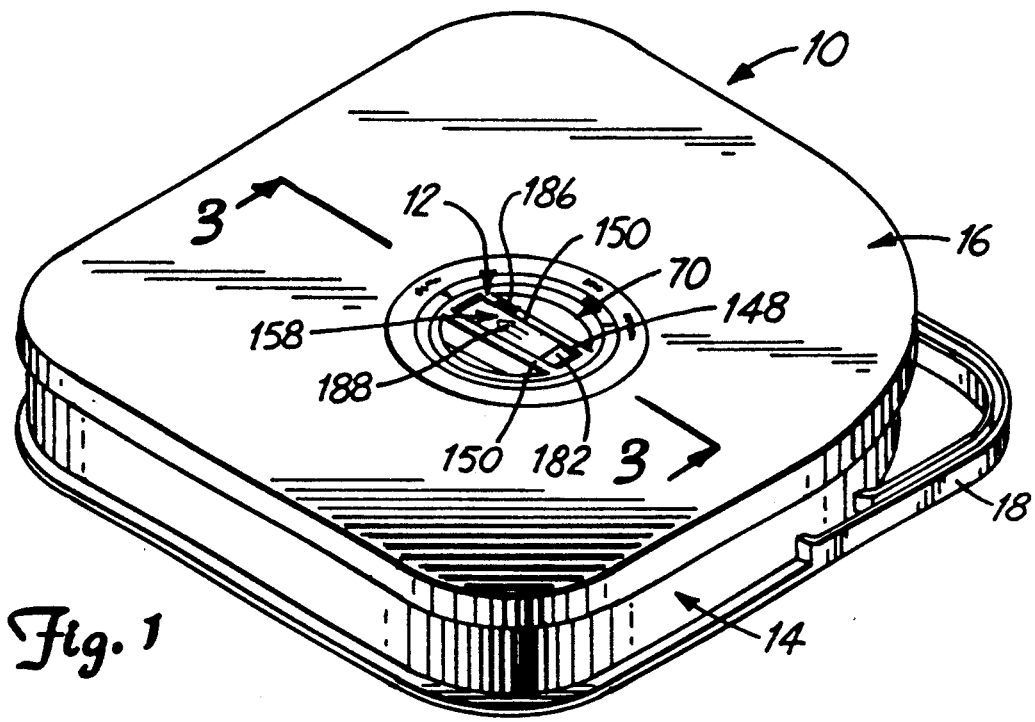
FIG. 1 is a perspective view of a magnetic reel shipping case incorporating the lock assembly of the present invention.

A magnetic reel shipping case 10 which includes a locking assembly 12 in accordance with the present invention is illustrated generally in FIG. 1. Shipping case 10 includes a base member 14 and a lid member 16. A handle 18 is formed integrally with the base member 14 to allow the shipping case to be easily carried.

Figure 2:
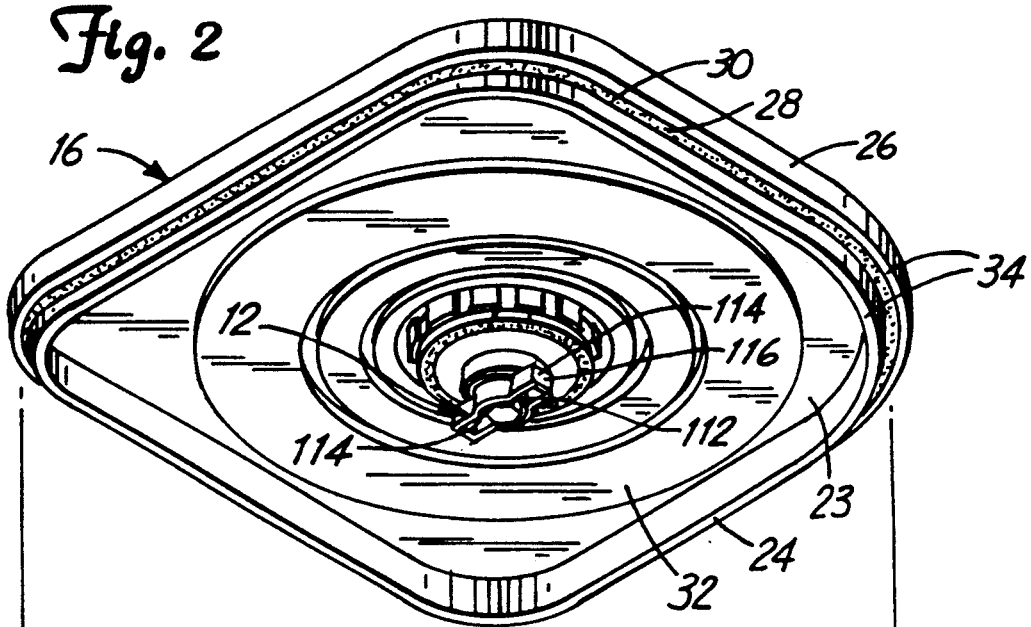
FIG. 2 is an exploded perspective view showing the shipping case with the lid removed from the base.
Figure 2:
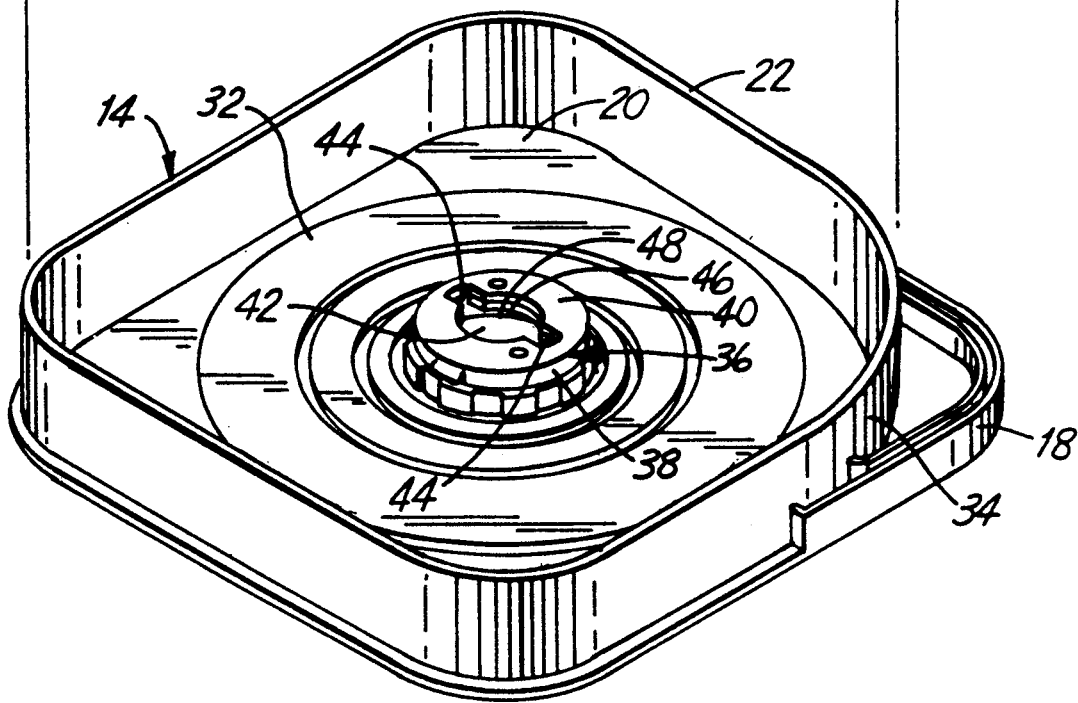

As seen in FIG. 2, base member 14 includes a floor portion 20 having an upstanding peripheral side wall 22. Lid member 16 includes a planar portion 23, an upstanding side wall 24 and a short upstanding circumferential wall 26 around the edge of side wall 24. A channel 28 is formed between the circumferential wall 26 and side wall 24. A resilient sealing member 30 is disposed within the channel 28. Base and lid members 14 and 16 each include a bearing ring 32 that helps prevent translatory movement of a magnetic tape reel (not shown) stored within shipping case 10. When the lid and base members 16 and 14 are assembled to form shipping case 10, peripheral side wall 22 is engaged between circumferential wall 26 and side wall 24, and contacts the resilient sealing member 30. Side walls 22 and 24 and circumferential wall 26 are formed with a shallow radial curved portion 34 that requires that the lid member 16 be assembled to the base member 14 in a specific orientation.

As shown in FIG. 2, base member 14 includes a protruding central hub 36 having a cylindrical wall 38 and a bottom wall 40. A through opening 42 having oppositely directed cutouts 44 is provided in the bottom wall 40. A ledge 46 is formed on the interior surface of the bottom wall 40 and includes a pair of ramped surfaces 48 (only one of which is shown), whose function is discussed below.

Figure 3:
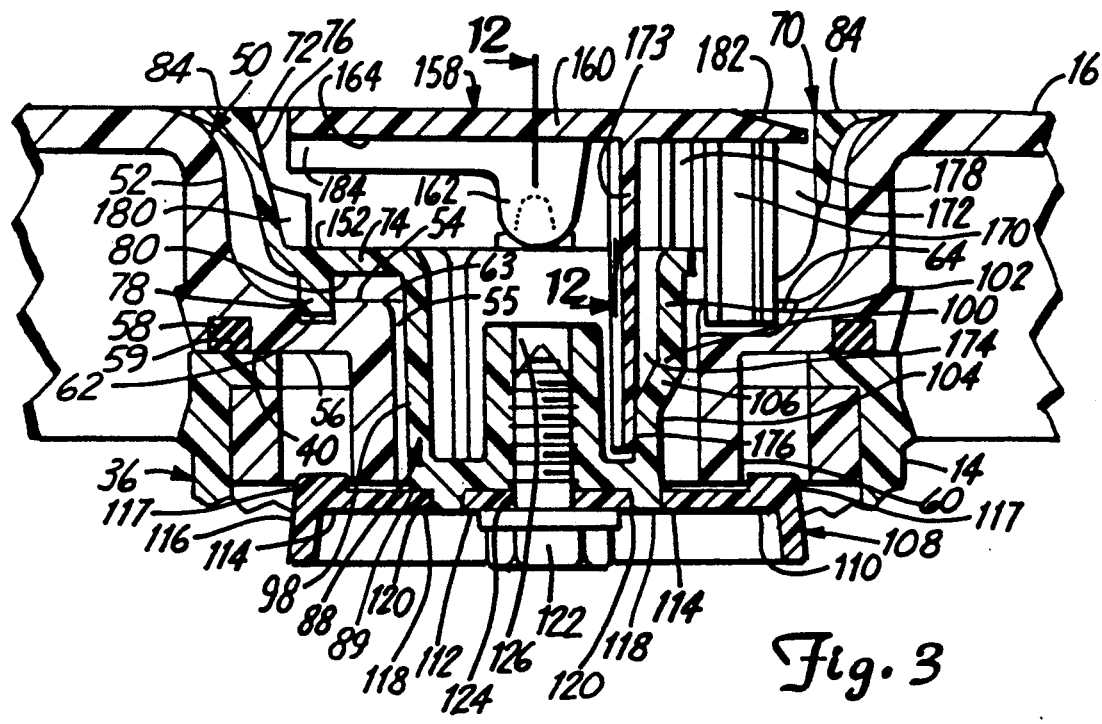
FIG. 3 is an enlarged sectional view as taken along lines 3—3 in FIG. 1, showing the components of the lock assembly, including a first embodiment of the latch bar fastener assembly.
Figure 4:
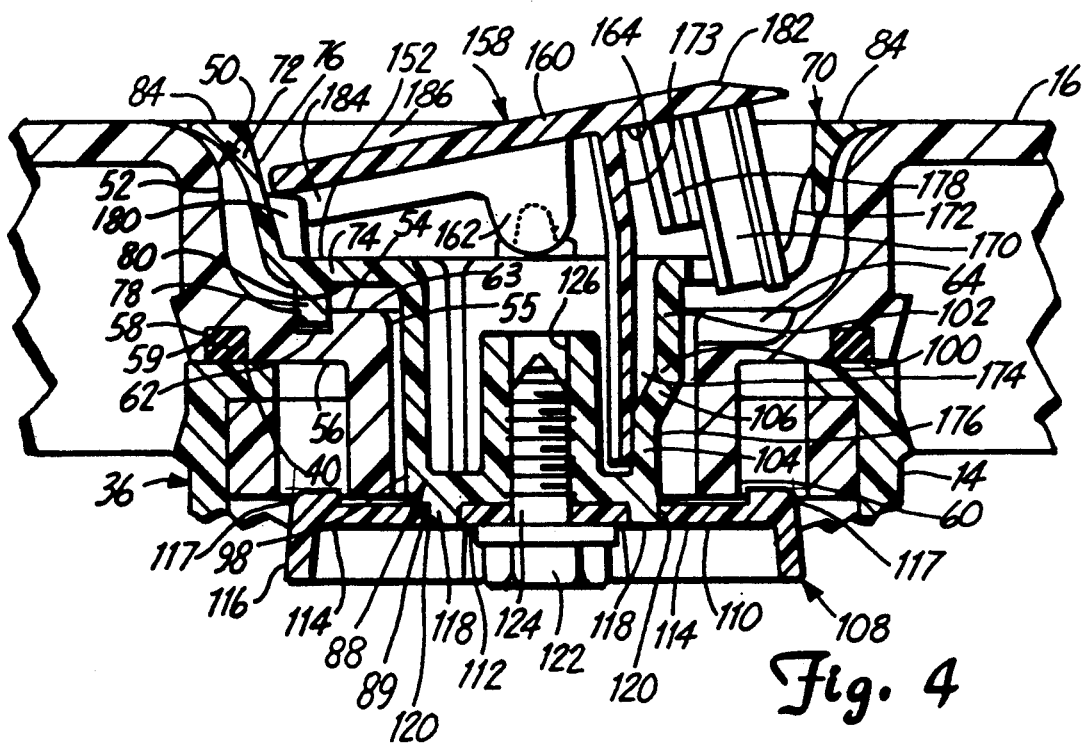
FIG. 4 is an enlarged sectional view similar to FIG. 3, showing the lock operator pivoted out of engagement with a lid member detent.

The lock assembly 12 is shown in sectional detail in FIGS. 3 and 4 which illustrates the lid member 16 and base member 14 is an assembled configuration. As seen in FIG. 3, the lid member 16 includes a recessed hub 50 defined by a cylindrical side wall 52 and an arcuate shoulder 54 with a through opening 55. Bottom surface 56 of the arcuate shoulder 54 includes a channel 58 and an outwardly extending cylindrical wall 60 at the periphery of the through opening 55. A resilient member 59 is mounted within channel 58 and acts as a cushion when the bottom wall 40 of the protruding hub 36 is engaged therewith. An arcuate guide groove 62 is provided on a top surface 63 of the arcuate shoulder 54.

Figure 5:
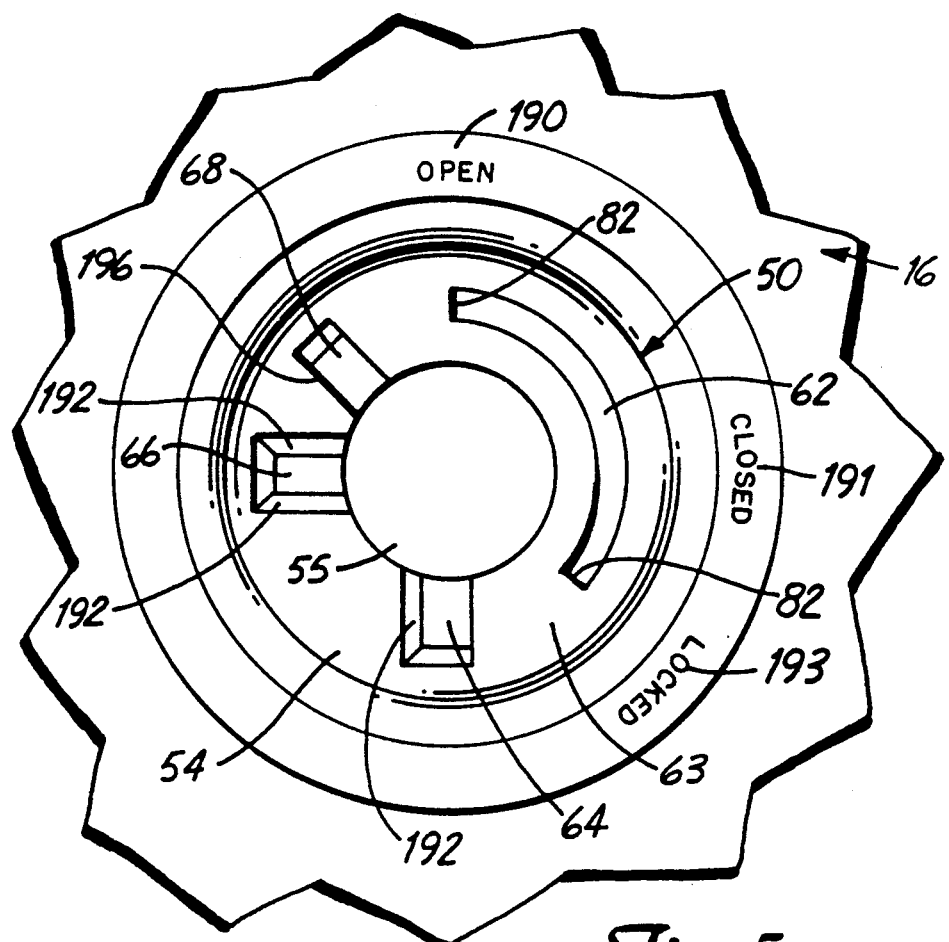
FIG. 5 is a top elevational view of the lid of the shipping case with the lock assembly removed showing details of the lock detents.

As seen in FIG. 5, the top surface 63 of the arcuate shoulder 54 of the lid member 16 further includes three arcuately spaced detents corresponding to different locking states of lock assembly 12. A first detent 64 corresponds to the open state of the shipping case 10 wherein the lid member 16 can be separated from the base member 14. Spaced approximately 90° from first detent 64 is a second detent 66 which defines the closed state of the case in which the base 14 and lid member 16 are secured together. A third detent 68 corresponding to the fully locked condition of the shipping case 10, and is radially spaced from the second detent 66 approximately 45°. The first, second and third detents are further described below in conjunction with the operation of the lock assembly 12.

The lock assembly 12 includes a knob or latch operator 70 having a bowl 72 defined by a bottom portion 74 and an upstanding wall 76. The knob 70 is rotatably received within the recessed hub 50 with the bottom portion 74 slightly spaced from the top surface 63 of the arcuate shoulder 54. Guide pin 78 integrally formed on a lower surface 80 of the bottom portion 74 rides within the arcuate guide groove 62. Terminal end portions 82 (see FIG. 5) of the arcuate guide groove 62 limit the extent of rotational movement of the knob 70 to that defined by the first, second and third detents 64, 66 and 68. The upstanding wall 76 includes a radial lip 84 along the upper edge thereof and four peripherally spaced nubs 86 (shown best in FIG. 11) that help center the knob 70 within the recessed hub 50 relative to the cylindrical side wall 52.

Integrally formed with the lower surface 80 of the bottom portion 74 is an hourglass-shaped outwardly extending body 88. The body 88 includes an end portion 89, side walls 90 formed by curved portions 92, angled surfaces 94 and centering ridges 96 (see FIGS. 6, 8 and 10). Centering ridges 96 engage the interior surface of the cylindrical wall 60 to help center the knob 70 within the recessed hub 50. The body 88 further includes a first curved end wall 98 adjacent to the guide pin 78. An opposite second end wall 100 is defined by a curved portion 102, an angled intermediate surface 106 and a planar portion 104, as seen in FIGS. 3 and 4.

A latch bar 108 is affixed to the end portion 89 of the body 88 and includes a planar base 110 defined by a circular center portion 112 and a pair of oppositely directed extensions 114. A circumferential wall 116 is integrally formed about the peripheral edge of the planar base 110. The latch bar 108 further includes a pair of spaced centering flanged 117 that engage the outer edge of cylindrical wall 60 to center the latch bar relative to the lid member 16. In the preferred embodiment shown in FIGS. 3 and 4, the end portion 89 of the body 88 includes a pair of oblong-shaped spaced protrusions 118 which engage a pair of oblong-shaped openings 120 extending through the planar base 110 of the latch bar 108. The protrusions 118 when engaged with the openings 120 ensure that the latch bar 108 rotates with the knob 70. A fastener such as screw 122 extends through a center bore 124 in the planar base 110 and threadably engages a central cylindrical bore 126, extending from the end portion 89 along the longitudinal extent of the body 88, to secure the latch bar 108 to the knob 70.

Figure 6:
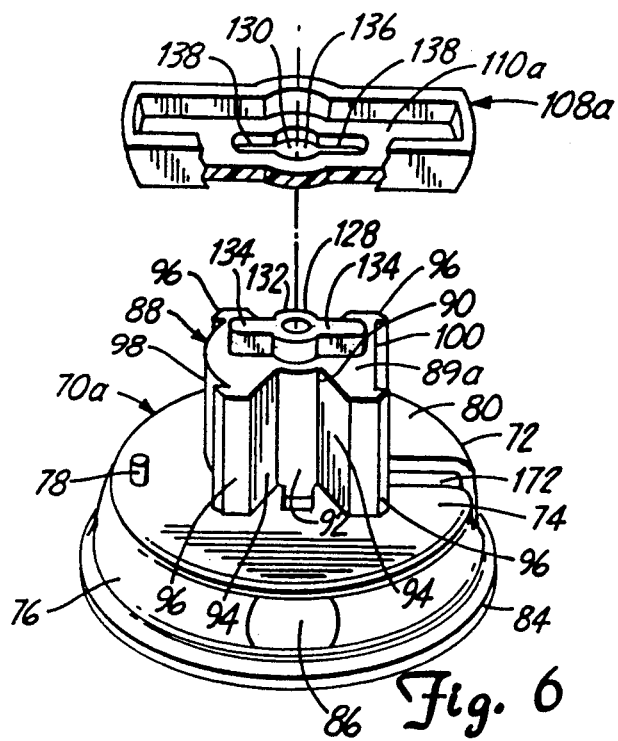
FIG. 6 is an exploded perspective view of the knob and latch bar showing a second embodiment of the latch bar fastener assembly.
Figure 7:
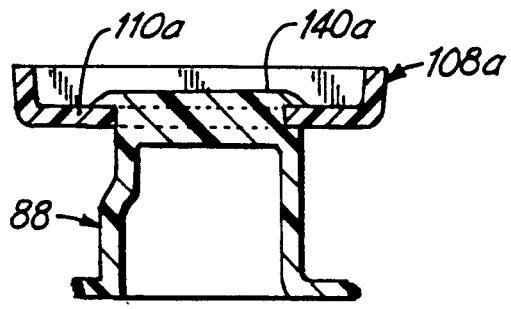
FIG. 7 is a lateral sectional view of the latch bar and knob shown in FIG. 6, as assembled.

In another embodiment shown in FIGS. 6 and 7, the latch bar 108a is fixed relative to the knob 70a by a single protrusion 128 engaging an opening 130 extending through the planar base 110a. The protrusion 128 includes a cylindrical center portion 132 having a pair of oppositely directed wings 134. The opening 130 in the latch bar 108a is defined by a round opening 136 and a pair of oppositely directed slots 138, and is shaped to closely receive the protrusion 128. As shown in FIG. 7, latch bar 108a is secured to the knob 70a by deforming the free end of the protrusion 128 to form a ridge 140a. Preferably, the knob 70 is formed from a suitable plastic material, so that the protrusion 128 can be so deformed by ultrasonic staking or some other suitable means for specific desired deformation. The wings 134 engage the slots 138 so that the lock bar 108a rotates with the knob 70.

Figure 8:
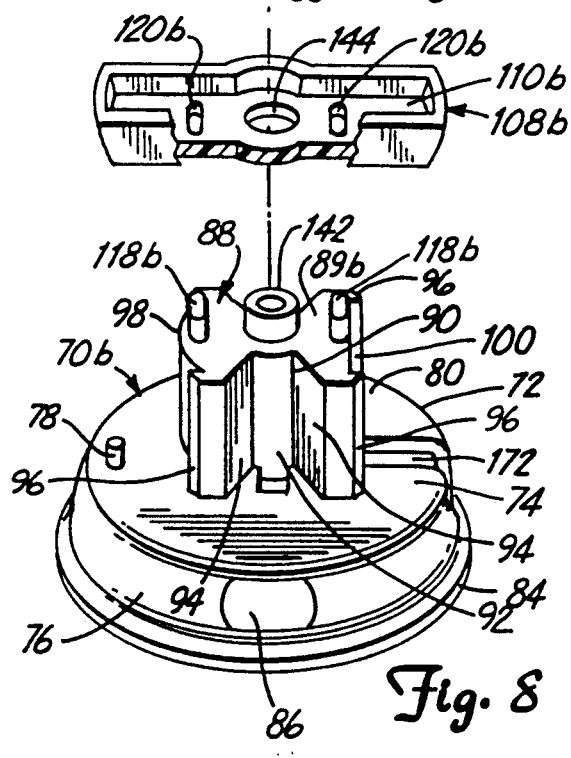
FIG. 8 is an exploded perspective view of the latch bar and knob showing a third embodiment of the latch bar fastener assembly.
Figure 9:
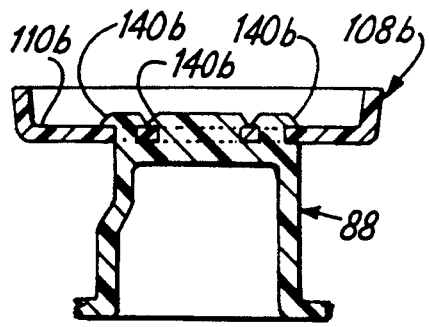
FIG. 9 is a lateral sectional view of the latch bar and knob shown in FIG. 8, as assembled

FIGS. 8 and 9 show a third embodiment, in which latch bar 108b end portion 89b are modified. The end portion 89b is provided with a pair of oblong-shaped protrusions 118b longer than but otherwise identical to those in the first embodiment. The protrusions 118b are aligned with and engage a pair of spaced oblong-shaped openings 120b in the planar base 110b and perform the same function as those in the first embodiment. The end portion 89b further includes a cylindrical center protrusion 142 which engages a round through opening 144 in the planar base 110b of the latch bar 108b. As shown in FIG. 9, latch bar 108b is secured to the knob 70 by deforming the free ends of all protrusions (118b and 142), thereby forming a plurality of ridges 140b.

Figure 10:
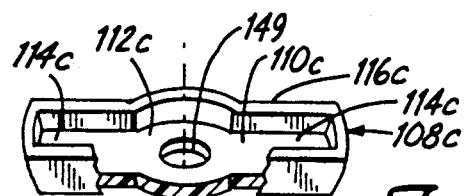
FIG. 10 is an exploded perspective view of the knob and latch bar showing a fourth embodiment of the latch bar fastener assembly.
Figure 11:
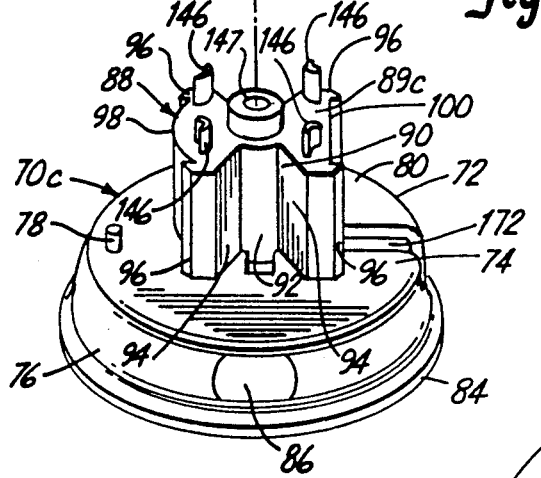
FIG. 11 is a top elevational view of the latch bar and knob shown in FIG. 10, as assembled.

A fourth embodiment is disclosed in FIGS. 10 and 11, in which the latch bar 108c is fixed to knob 70c to rotate therewith by four curved posts 146. The posts 146 engage the circumferential wall 116c at a point where the extensions 114c join the circular center portion 112c. End portion 89c further includes a cylindrical center protrusion 147 similar to that shown in connection with the second embodiment, that engages a round through opening 149 in the planar base 110c. The free end of the center protrusion 147 is deformed, forming a ridge 140c that secures the latch bar 108c to knob 70c (see FIG. 11).

Figure 12:
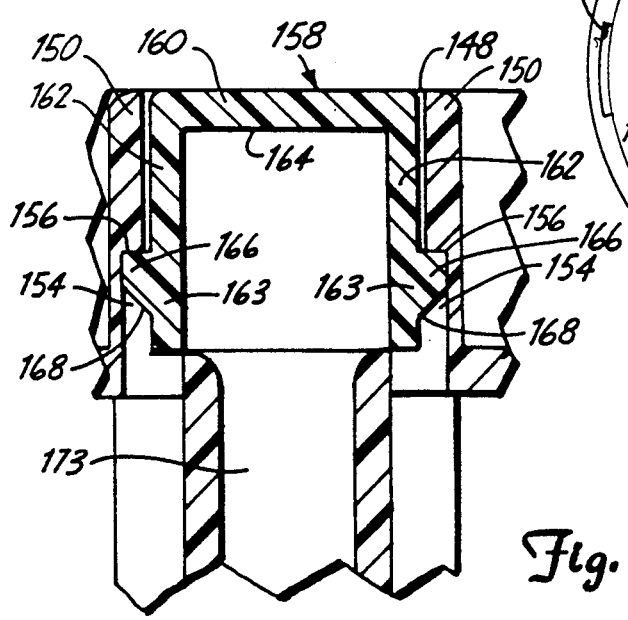
FIG. 12 is an enlarged sectional view as taken along lines 12—12 in FIG. 3, showing the lock operator pivotally engaged with the slots of the channel walls.

As shown in FIG. 12, the bowl 72 of the knob 70 further includes a transverse channel 148 formed by a pair of spaced parallel walls 150 extending outwardly from an interior surface 152 of the bottom portion 74. Each wall 150 includes a slot 154 having a terminal shoulder portion 156. The channel 148 pivotally receives a lock operator 158.

FIG. 12 illustrates the pivotal connection employed for actuation of the lock operator 158 relative to the channel 148 of the bowl 72. Lock operator 158 includes a planar member 160 having a pair of spaced resilient arms 162 extending outwardly from the median of a lower surface 164 thereof. Free end 163 of each arm 162 includes an integrally formed, transverse pivot lug 166 having a ramped surface 168 (see FIG. 12). The terminal shoulder portions 156 of the slots 154 rotatably receive the pivot lugs 166 to allow the lock operator 158 to pivot relative to the channel 148 of the knob 70. Inserting the lock operator 158 into the channel 148 forces the ramped surfaces 168 to engage the walls 150, flexing the resilient arms 162 toward one another. When the pivot lugs 166 reach the slots 154, the resilient arms 162 return to their unflexed state and the pivot lugs 166 engage the terminal portions 156 of the slots 154.

As in FIGS. 3 and 4, lock operator 158 further includes a lock beam 170 integrally formed on the lower surface 164 of the planar member 160. Within the channel 148, an aperture 172 extends through the bottom portion 74 thereof and a portion of the upstanding wall 76 of the bowl 72. The lock beam 170 extends through the aperture 172 to engage any one of the detents 64, 66 or 68 upon rotation of the knob 70. In FIG. 3, the lock beam 170 is shown as received within the detent 64.

The planar member 160 further includes a resilient spring plank 173, integrally formed on the lower surface 164 adjacent the arms 162. As shown in FIGS. 3 and 4, the resilient spring plank 173 is received within a recess 174 integrally formed in the body 88. The recess 174 extends through the bottom portion 74 of the bowl 72 within the channel 148. A distal portion of the resilient spring plank 173 engages an interior surface 176 of the planar portion 104 and acts to bias the lock beam 170 into engagement with any one of the detents 64, 66 or 68.

An integral limiting beam 178 is formed on the lower surface 164 of planar member 160 adjacent the lock beam 170, and prevents the lock beam 170 from bottoming out in the detents by restricting rotation of the lock operator 158 in a clockwise direction as viewed in FIG. 3. Excessive counterclockwise rotation of the lock beam 170 is prevented by contact of the lower surface 164 thereof with a second limiting projection 180 integrally formed on the bottom portion 74 and upstanding wall 76, opposite opening 172 in the bowl 72.

To assemble the shipping case 10, the knob 70 is rotated to align arrow 188 on the lock operator 158 with the indicator 190 on the lid 16 which indicates the open state of the shipping case 10 (see FIGS. 1 and 5). In this position, the lock beam 170 is engaged with the first detent 64 in the lid member 16. Lid member 16 is then aligned with the base member 14 as directed by the shallow curved portions 34.

Assembly of the lid member 16 which the base member 14 causes the latch bar 108 to be received through the cutouts 44 of the opening 42. Rotation of the knob 70 toward the indicator 191 (indicating the closed state of the shipping case 10) causes the latch bar 108 to engage the ramped surfaces 48 on the ledge 46, thereby drawing the lid member 16 into tighter engagement with the base member 14. Ramped surface 192 (see FIG. 5) associated with the first detent 64 forces the lock beam 170 out of detent 64 against the spring bias of resilient spring plank 173 as the knob 70 is rotated. The lock member thus assumes a tilted or canted position during rotation, when the lock beam 170 is not received within any of the detents.

Upon reaching the indicator 191, the lock beam 170 is biased by the resilient spring plank 173 into engagement with the second detent 66. The second detent 66 has a pair of ramped surfaces 192 that perform the same function as the ramped surface 192 associated with the first detent 64. Hence, rotating the knob back to the open state indicator 190 (or onto a locked state indicator 193 of the case 10), allows the ramped surfaces 192 to force the lock beam 170 out of engagement with the second detent 66.

Rotating the knob 70 to the locked state indicator 193 brings the lid 16 and the base 14 into tighter engagement until the lock beam 170 is biased into engagement with the third detent 68. The third detent 68 includes a perpendicular wall 196, which therefore requires that the lock operator 158 be manually pivoted against the bias of resilient spring plank 173 to raise the lock beam 170 a distance to clear the wall 196 of the third detent 68, thereby permitting rotation of the knob 70 relative to the shipping case 10.

The planar member 160 further includes a tapered portion 182 and an integral flange 184 that covers a finger cutout 186 in wall 150 as shown in FIGS. 1, 3 and 4. If the knob 70 is left between any of the open, closed or locked indicators 190, 191 and 193 with the lock beam 170 out of engagement with any of the detents 64, 66 and 68, the tapered surface 182 on the lock operator 158 prevents damage to the lock assembly 12 when the shipping case 10 is slid relative to a fixed object.

The lock assembly of this invention has fewer component parts then prior art devices thereby forming an efficient and effective latch. In addition, material costs are reduced and the component parts are easier to assemble.

Although the present invention has been described with reference to preferred embodiments, workers skilled in the art will recognize that changes may be made in form and detail without departing from the spirit and scope of the invention.

What is claimed is:

1. A container assembly comprising:
   a base member;
   a lid member releasably engageable with the base member to form a closed container; and
   a lock assembly for locking the lid member to the base member including:
      a latch operator rotatably mounted to the lid member for movement between an unlatched position wherein the lid member is readily disengageable from the base member and a latched position wherein the latch operator is engaged with a hub portion of the base member to secure the lid member thereto;
      a lock operator;
      a pivot assembly for pivotally mounting the lock operator to the latch operator for movement between an unlocked position wherein the latch operator is free to rotate between the latched and unlatched positions and a locked position wherein the lock operator engages a portion of the lid member to lock the latch operator in the latched position; and
      a biasing element integrally formed on the lock operator and engaging a portion of the latch operator to bias the lock operator to the locked position.

2. The container assembly of claim 1 wherein the lock operator includes a planar member and the biasing element includes a resilient spring plank integrally formed on a bottom surface of the planar member.

3. The container assembly of claim 2 wherein the planar member includes a pair of spaced arms extending outwardly from the bottom surface at the median thereof and the pivot assembly includes:
   a pair of pivots formed on one of the latch operator or lock operator engaging a pair of slots formed in the other operator.

4. The container assembly of claim 3 wherein each pivot compromises an integral lug on a free end of each of the arms for engaging a terminal edge of a respective slot formed in the latch operator.

5. The container assembly of claim 1 wherein the latch operator includes:
   a knob including:
      a body having an end portion;
      a latch bar that engages the hub portion of the base member when the latch operator body is rotated to the latched position; and
      a fastener assembly for mounting the latch bar to the end portion of the body.

6. The container assembly of claim 5 wherein the fastener assembly includes:
   the latch bar having an opening extending therethrough; and
   a protrusion on the end portion of the body for engaging the opening in the latch bar.

7. The container assembly of claim 6 wherein:
   the latch bar has a pair of spaced openings; and
   the protrusion comprises:
      a pair of spaced protrusions each aligned to engage one of the openings.

8. The container assembly of claim 5 wherein the fastener assembly further includes:
   a center bore midway between opposite ends of the latch bar;
   a central cylindrical bore extending from the end portion along a longitudinal extent of the body of the knob; and
   a fastener that protrudes through the latch bar center bore and frictionally engages the cylindrical bore of the body to rigidly attach the latch bar to the body.

9. The container assembly of claim 8 wherein the fastener is a screw.

10. The container assembly of claim 6 wherein:
    the latch bar has a pair of spaced openings and a center opening located between the pair of spaced openings;
    the protrusion includes:
       a pair of spaced protrusions each aligned to engage one of the spaced openings; and
       a cylindrical center protrusion located between the pair of spaced protrusions for engaging the center opening; and
    the fastener assembly further includes:
       a fastener for securing the latch bar to the end portion of the body.

11. The container assembly of claim 6 wherein:
    the latch bar has a round opening having a pair of oppositely directed slots;
    the protrusion includes:
       a cylindrical center protrusion having a pair of oppositely directed projections for engaging the round opening and the pair of oppositely directed slots, respectively; and
    the fastener assembly further includes:
       a fastener for securing the latch bar to the end portion of the body.

12. The container assembly of claim 6 wherein the fastener assembly further includes:
    a plurality of upstanding posts on the end portion of the body for engaging an exterior peripheral edge of the latch bar; and
    a fastener for securing the latch bar to the end portion of the body.

13. The container assembly of claim 11 wherein the fastener includes:
    deforming a free end of each protrusion.

14. The container assembly of claim 12 wherein the fastener includes:
    deforming a free end of each protrusion.

15. The container assembly of claim 13 wherein the fastener includes:
    deforming a free end of each protrusion.

16. A lock assembly for a shipping case of the type comprising a first housing member with a recessed hub having a center aperture extending therethrough, the hub defining an arcuate shoulder having a plurality of detents formed therein, and a second housing member releasably securable to the first housing member and having a cylindrical protruding hub including a bottom wall defining an arcuate ledge on an interior surface thereof, including:
    a knob rotatably received in the center aperture of the recessed hub and including:
       a bowl having an arcuate side wall extending outwardly and a bottom for riding on the arcuate shoulder, a channel extending across the diameter of the bowl and an opening disposed within the channel and extending through the bottom of the bowl;

an integral body formed on the exterior of the bottom of the bowl and extending through the center aperture of the recessed hub, the body including sidewalls and an end portion and within the body a recess having an opening extending through the bottom of the bowl;

a latch bar having opposite ends engageable with the arcuate ledge to secure the first housing member to the second housing member;

a fastener assembly for mounting the latch bar to the end portion of the integral body; and a lock operator insertable into the knob and including:

a planar member set within and extending the length of the channel;

a locking beam extending outwardly from the bottom surface of the planar member and extending through the opening within the channel for releasably engaging a selected one of the plurality of detents in the recessed hub upon rotation of the knob; and an integral, resilient spring plank extending outwardly from the bottom surface of the planar member and engaged with the recess of the body to bias the locking beam into engagement with a selected one of the plurality of detents.

17. The lock assembly of claim 16 further including a pivot assembly for pivotally mounting the lock operator to the channel of the knob, including:

a pair of spaced arms extending outwardly from the bottom surface of the planar member at the median thereof;

a pair of spaced slots, one in each wall of the channel; and an integral lug on a free end of each of the arms pivotally engaging a terminal edge of each slot.

18. The lock assembly of claim 16 wherein the lock operator further includes an integral limiting beam extending outwardly from the bottom surface of the planar member and located adjacent to the lock beam for limiting the extent to which the lock beam can move as a result of the spring bias of the resilient spring plank.

19. The lock assembly of claim 17 wherein the channel includes a limiting protrusion extending outwardly from the bottom of the bowl for limiting the extent to which the lock operator can be pivoted so as to remove the lock beam from engagement with the selected detent.

20. The lock assembly of claim 16 wherein the planar member further includes a tapered end on an upper surface thereof.

21. The lock assembly of claim 16 wherein the latch bar includes a pair of spaced centering flanges for engaging an exterior surface of the recessed hub to help center the latch bar relative to the first housing member.

22. The lock assembly of claim 16 wherein the shoulder of the recessed hub includes a guide groove and the bowl includes a guide pin on the exterior surface of the bottom for engaging the guide groove, the guide groove limiting the extent to which the knob can rotate relative to the recessed hub.

23. A shipping case comprising:

a first housing member having a recessed hub with a center aperture extending therethrough, the recessed hub having an arcuate shoulder with a plurality of detents formed therein;

a second housing member having a cylindrical protruding hub with a center cavity having diametrically opposed cut outs, the first housing member being releasably mountable on the second housing member to form the case;

a knob rotatably received in the center aperture of the recessed hub and including:

a bowl member having a bottom, an arcuate sidewall extending outwardly therefrom, an interior surface and an exterior surface, the exterior surface of the bottom riding on the arcuate shoulder of the recessed hub;

a channel formed within the bowl by a pair of spaced parallel walls extending outward from the interior surface of the bottom with a length extending across a diameter of the bowl, and within the channel a rectangular hole extending through the bottom of the bowl;

an integral body perpendicular to the exterior surface of the bottom of the bowl and extending through the center aperture of the recessed hub, the body including a plurality of sidewalls and an end portion and within the body a recess having an opening in the bottom of the bowl and located adjacent the rectangular opening;

a latch bar having opposite ends and being mounted to the end portion of the integral body, the opposite ends of the bar member being releasably received through the cut outs of the center cavity and upon rotation of the bar member together with a knob releasably mounting the first housing member to the second housing member;

a fastener assembly for mounting the latch bar to the end portion of the integral body; and, a lock operator insertable into the knob and including:

a planar member set within and extending the length of the channel;

a pivot assembly on the planar member for pivotally attaching the planar member within the channel;

an integral locking beam perpendicular to and extending outward from a bottom surface of the planar member through the rectangular opening in the channel for selectively engaging one of the detents in the recessed hub upon rotation of the knob and thereby locking the knob against rotational movement relative to the first housing member; and, an integral spring plank extending outward from and perpendicular to the bottom surface of the planar member, the plank being engaged with the recess of the body and acting as a spring to bias the locking beam into engagement with a selected detent.

* * * * *